United States Patent
Funamoto

(10) Patent No.: US 8,368,775 B2
(45) Date of Patent: Feb. 5, 2013

(54) IMAGING APPARATUS AND LIVE-VIEW IMAGE DISPLAY METHOD THEREOF

(75) Inventor: Kenji Funamoto, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 521 days.

(21) Appl. No.: 12/697,870

(22) Filed: Feb. 1, 2010

(65) Prior Publication Data

US 2010/0194917 A1    Aug. 5, 2010

(30) Foreign Application Priority Data

Feb. 3, 2009  (JP) ................ P2009-022757

(51) Int. Cl.
- *H04N 5/228* (2006.01)
- *H04N 9/73* (2006.01)
- *H04N 5/235* (2006.01)
- *G06K 9/36* (2006.01)
- *G06K 9/46* (2006.01)

(52) U.S. Cl. ............... 348/223.1; 348/229.1; 348/222.1; 382/232

(58) Field of Classification Search ....... 348/222.1–230; 382/162–167, 173–180
See application file for complete search history.

(56) References Cited

U.S. PATENT DOCUMENTS

| | | | | |
|---|---|---|---|---|
| 8,040,391 B2 * | 10/2011 | Ito et al. | ...................... | 348/223.1 |
| 8,103,111 B2 * | 1/2012 | Horie et al. | ................... | 382/232 |
| 8,106,954 B2 * | 1/2012 | Sato et al. | ................... | 348/217.1 |
| 8,144,214 B2 * | 3/2012 | Yamashita et al. | ......... | 348/229.1 |
| 2009/0040335 A1 * | 2/2009 | Ito et al. | ..................... | 348/223.1 |

FOREIGN PATENT DOCUMENTS

| | | |
|---|---|---|
| JP | 2007-006158 (A) | 1/2007 |
| JP | 2007-274581 A | 10/2007 |
| JP | 2008-211843 A | 9/2008 |

OTHER PUBLICATIONS

Japanese Office Action dated Jul. 24, 2012, with English translation.

* cited by examiner

*Primary Examiner* — Jason Chan
*Assistant Examiner* — Pritham Prabhakher
(74) *Attorney, Agent, or Firm* — McGinn IP Law Group, PLLC

(57) ABSTRACT

A digital camera has a live-view image shooting mode in which a process of shooting a subject, generating image data from imaging signals acquired by the shooting, and displaying a live-view image based on the image data on a display section is repeatedly performed. The digital camera includes a solid-state imaging device 5 that shoots the subject, a live-view processing section 26 and a display control section 22. The live-view processing section 26 performs different image processings for imaging signals of two groups to generate two pieces of image data. The imaging signals of the two groups are obtained when imaging signals, which are output from the solid-state imaging device 5 in single shooting in the live-view image shooting mode, are divided into the two groups. The display controller displays, on the display section, a screen which includes two live-view images based on the two pieces of image data.

10 Claims, 12 Drawing Sheets

WB ADJUSTMENT

γ CORRECTION PROCESSING

INTERPOLATION PROCESSING

HORIZONTAL RESIZING PROCESSING

STORE INTO LINE BUFFER

IMAGING APPARATUS AND LIVE-VIEW IMAGE DISPLAY METHOD THEREOF

CROSS-REFERENCE TO RELATED APPLICATIONS

This application claims the benefit of Japanese Patent Application No. 2009-22757 filed Feb. 3, 2009, the entire contents of which are hereby incorporated by reference, the same as if set forth at length.

BACKGROUND OF THE INVENTION

1. Technical Field

The present invention relates to an imaging apparatus and a live-view image display method thereof.

2. Description of the Related Art

An imaging apparatus, such as a digital camera, has a function of displaying a so-called live-view image on a monitor by repeating a series of operations including a shooting process, generation of display image data, and display of an image based on the generated display image data on a monitor, when a shooting mode which is used to perform shooting is set. Then, a user can shoot while checking framing or a shooting state using the displayed live-view image.

Also, the imaging apparatus has a function of shooting while changing image processing parameters such as a white balance, chroma, and tone. For example, it is possible to set various modes (hereinafter, referred to as "image processing modes") which are different in image processing even if they are the same in shooting condition, such as exposure. Examples of the various image processing modes include (i) a standard mode in which a subject is expressed with red (R), green (G), and blue (B) colors, (ii) a sepia mode in which a subject is reproduced in sepia, (iii) a monochrome mode in which a subject is expressed with black and white colors, and (iv) a film mode in which a subject can be expressed as if the subject is shot with a particular silver halide film.

Thus, since many image processing modes can be set, a user may wonder which image processing mode is suitable for a scene. For this reason, JP 2008-211843 A and JP 2007-274581 A have proposed the following imaging apparatuses. That is, imaging apparatuses perform plural different image processings for image data acquired by shooting and perform multi-screen display of a plurality of live-view images, which have been subjected to the different image processing, respectively, on a monitor. In these imaging apparatuses, it is possible to compare the images obtained through the different image processing with each other. Accordingly, it becomes easy to select an image processing mode suitable for the scene.

FIG. 13 is a view showing an example of the configuration of an imaging apparatus and an example of a timing charge for image generation. In this imaging apparatus, dot-sequential imaging signals (RAW data) which are acquired from an imaging sensor by shooting under control of a shooting control section are recorded in a memory such as an SDRAM, image processing is sequentially performed for the RAW data plural times (in this example, twice) while changing image processing parameters, screen data is generated by mixing image data (an image 1 and an image 2) which are acquired by the image processing, and then two live-view images are displayed on a monitor by displaying a screen based on the screen data on the monitor.

In the configurations shown in FIG. 13, JP 2008-211843 A and JP 2007-274581 A, it is necessary to perform the image processing for the RAW data twice in order to display one screen. Accordingly, if the configurations are compared with a general configuration in which only one live-view image is displayed, an amount of image processing simply doubles. Increase in amount of image processing is proportional to the number of live-view images displayed on a monitor. Accordingly, in order to display three or four live-view images, the amount of image processing increases to be three or four times as large as that in the general configuration. As a result, the power consumption increases with increase in amount of image processing. Particularly, if the size of RAW data becomes large due to increase in number of pixels of the imaging sensor, there is a concern that the power consumption will further increase. Also, as the number of pixels increases, the driving frequency of the imaging sensor also increases. As a result, the power consumption further increases. For this reason, if a function of displaying a plurality of live-view images is provided, increase in power consumption becomes more noticeable.

As another method of displaying a plurality of live-view images, FIG. 14 shows a method in which a plurality of live-view image processing sections are provided which generate the display image data by pipeline processing, and plural image processings are simultaneously performed for the RAW data. In this method, however, there is a concern that cost, power consumption, and an apparatus size will increase because the plurality of live-view image processing sections are provided.

Moreover, as further another example of displaying a plurality of live-view images, FIG. 15 shows a method in which one live-view image processing section is provided and an image 1 and an image 2 are generated alternately for every frame while changing the image processing for every frame in the live-view image processing section. In this method, there is no concern that cost, power consumption, and an apparatus size will increase because one live-view image processing section is provided. However, the image 1 and the image 2 are different in shooting timing. Accordingly, if there is a moving subject, the subject in the image 1 and the subject in the image 2 would be shot at different timings. For this reason, it is difficult to accurately compare the image 1 with the image 2. Also, since both the image 1 and the image 2 are displayed as images which are thinned out by one frame, a frame rate of each of the two live-view images is reduced, which makes it difficult to smoothly display images.

SUMMARY OF THE INVENTION

The invention has been made in view of the above circumstances, and provides an imaging apparatus and a live-view image display method of the imaging apparatus which can display a plurality of types of live-view images for the same subject while suppressing reduction in frame rate and increase in power consumption.

According to an aspect of the invention, an imaging apparatus has a live-view image shooting mode in which a process of shooting a subject, generating image data from imaging signals acquired by the shooting, and displaying a live-view image based on the image data on a display section is repeatedly performed. The imaging apparatus includes a solid-state imaging device, an image data generating unit, and a display controller. The solid-state imaging device shoots the subject. The image data generating unit performs different image processings for imaging signals of respective groups to generate n pieces of image data. The imaging signals of the respective groups are obtained when imaging signals, which are output from the solid-state imaging device in single shooting in the live-view image shooting mode, are divided into the n groups. n denotes natural number equal to or larger than 2. The display controller displays, on the display section, a screen which includes n live-view images based on the n pieces of image data. The imaging signals are input to the image data generating unit in an order in which the imaging signals are output from the solid-state imaging device. A dividing pattern in which the imaging signals are divided into the n groups is set so that the imaging signals of the different groups are input to the image data generating unit every predetermined number of imaging signals. The image data generating unit includes a signal processing section that performs the signal processes for the input imaging signals using predetermined signal processing parameters. Whenever the signal process for the predetermined number of imaging signals ends, the signal processing section changes the signal processing parameter to a signal processing parameter corresponding to the group of the imaging signals which will be input next, and performs the signal process.

According to another aspect of the invention, an imaging apparatus has a live-view image shooting mode in which a process of shooting a subject, generating image data from imaging signals acquired by the shooting, and displaying a live-view image based on the image data on a display section is repeatedly performed. A live-view image display method of the imaging apparatus includes generating n pieces of image data by performing different image processings for imaging signals of respective groups, and displaying, on the display section, a screen which includes n live-view images based on the n pieces of image data. The imaging signals of the respective groups are obtained when imaging signals, which are output from a solid-state imaging device in single shooting in the live-view image shooting mode, are divided into the n groups. n denotes natural number equal to or larger than 2. The generating of the n pieces of image data includes performing signal processes, using predetermined signal processing parameters, for the imaging signals which are sequentially input in order of output from the solid-state imaging device. A dividing pattern in which the imaging signals are divided into the n groups is set so that the imaging signals of the different groups are input every predetermined number of imaging signals. During the performing of the signal processes in the generating of the n pieces of image data, whenever the signal process for the predetermined number of imaging signals ends, the signal processing parameter is changed to a signal processing parameter corresponding to the group of the imaging signals which will be input next, and the signal process is performed.

Here, the "live-view image" is a moving image which is shot and displayed before performing a still-image shooting operation as described above. A user adjusts framing to determine composition and/or confirms a shooting state while viewing the live-view image.

With the above configuration and steps, it is possible to provide an imaging apparatus and a live-view image display method of the imaging apparatus which can display plural types of live-view images for the same subject while suppressing reduction in frame rate and increase in power consumption.

DETAILED DESCRIPTION OF EMBODIMENTS OF THE INVENTION

Hereinafter, embodiments of the invention will be described with reference to the accompanying drawings.

Figure 1:
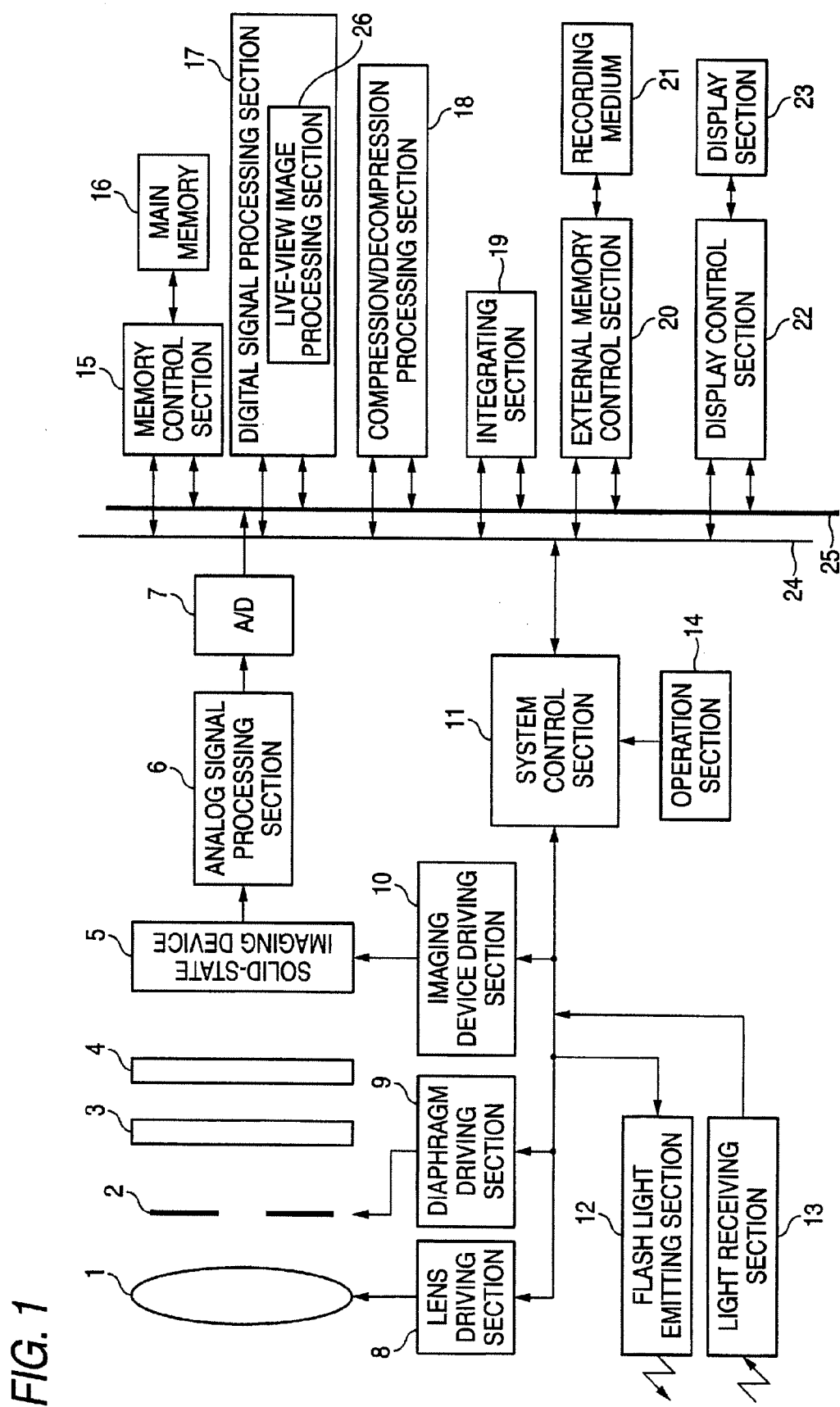
FIG. 1 is a view showing the schematic configuration of a digital camera which is an example of an imaging apparatus, for description of a first embodiment of the invention.

FIG. 1 is a view showing the schematic configuration of a digital camera which is an example of an imaging apparatus, for description of a first embodiment of the invention.

An imaging system of the digital camera shown in FIG. 1 includes an imaging lens 1, a solid-state imaging device 5 for shooting a subject, such as a CCD image sensor or a CMOS image sensor, a diaphragm 2 provided between the imaging lens 1 and the solid-state imaging device 5, an infrared cut filter 3, and an optical low pass filter 4.

A system control section 11 that makes an overall control of the entire electric control system of the digital camera controls a flash light emitting section 12 and a light receiving section 13, controls a lens driving section 8 to adjust a position of the imaging lens 1 to a focus position or to perform zoom adjustment, and controls an aperture of the diaphragm 2 through a diaphragm driving section 9 so as to adjust an amount of exposure light.

Also, the system control section 11 drives the solid-state imaging device 5 through an imaging device driving section 10 and outputs a subject image, which is shot through the imaging lens 1, as an imaging signal. An instruction signal from a user is input to the system control section 11 through an operation section 14.

The electric control system of the digital camera further includes an analog signal processing section 6 which is connected to an output of the solid-state imaging device 5 and performs analog signal processing, such as correlation double sampling processing, and an A/D conversion circuit 7 which converts RGB imaging signals, which are output from the analog signal processing section 6, into digital signals. The analog signal processing section 6 and the A/D conversion circuit 7 are controlled by the system control section 11.

Also, the electric control system of the digital camera includes a main memory 16, a memory control section 15, a digital signal processing section 17, a compression/decompression processing section 18, an integrating section 19, an external memory control section 20, and a display control section 22. The memory control section 15 is connected to the main memory 16. The digital signal processing section 17 performs white balance adjustment, an interpolation operation, a γ correction operation, RGB/YC conversion processing, and the like to generate image data. The compression/decompression processing section 18 compresses the image data generated by the digital signal processing section 17 in a JPEG format, and decompresses the compressed data. The integrating section 19 integrates photometric data and calculates a gain for the white balance correction which is performed by the digital signal processing section 17. A detachable recording medium 21 is connected to the external memory control section 20. A display section 23 mounted on a back surface of the camera is connected to the display control section 22. These components are connected to one another through a control bus 24 and a data bus 25 and are controlled by an instruction from the system control section 11.

The digital camera shown in FIG. 1 has a live-view image shooting mode in which a series of processings including shooting a subject with the solid-state imaging device 5, generating image data by the digital signal processing section 17 from imaging signals which are acquired from the solid-state imaging device 5 by the shooting, and displaying an image (hereinafter, referred to as a "live-view image"), which is based on the image data, on the display section 23 are repeatedly performed. When a shooting mode which is used to shoot is set in the digital camera, the digital camera transitions to the live-view image shooting mode, and a live-view image is displayed on the display section 23. Accordingly, the display section 23 can be used as a finder.

The digital signal processing section 17 includes a live-view image processing section 26 which generates the image data for displaying the live-view image in the live-view image shooting mode. The configuration of the live-view image processing section 26 will be described later.

Figure 2:
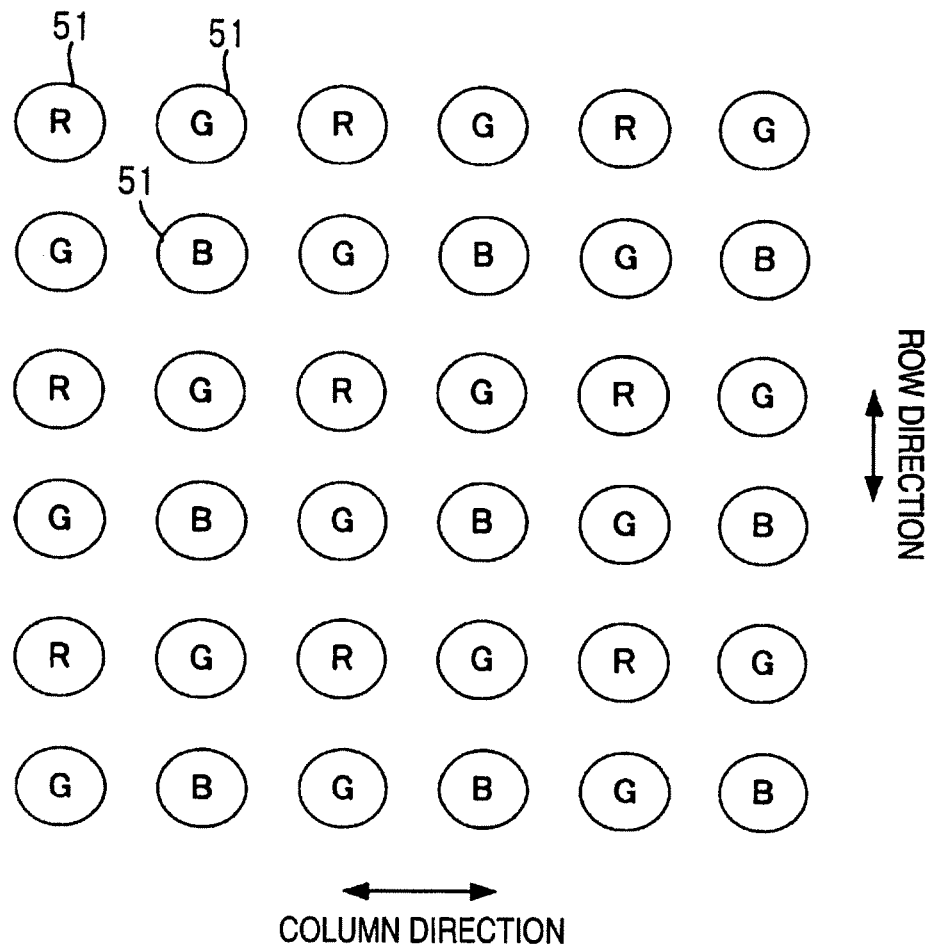
FIG. 2 is a partial plan view showing the schematic configuration of a solid-state imaging device shown in FIG. 1.

FIG. 2 is a partial plan view showing the schematic configuration of the solid-state imaging device 5 shown in FIG. 1. As shown in FIG. 2, the solid-state imaging device 5 has a plurality of photoelectric conversion elements 51 which are two-dimensionally arranged (in this example, the photoelectric conversion elements 51 are arranged in a square grid), that is, arranged on a substrate in a row direction and a column direction perpendicular to the row direction. A color filter is provided on a light receiving surface of each photoelectric conversion element 51, and the color filters are arranged in the Bayer pattern. The photoelectric conversion element 51 with "R" attached thereto in FIG. 2 (hereinafter, referred to as an "R photoelectric conversion element 51") has a color filter, which transmits light of a red (R) color, above its light receiving surface. The photoelectric conversion element 51 with "G" attached thereto in FIG. 2 (hereinafter, referred to as a "G photoelectric conversion element 51") has a color filter, which transmit lights of a green (G) color, above its light receiving surface. The photoelectric conversion element 51 with "B" attached thereto in FIG. 2 (hereinafter, referred to as a "B photoelectric conversion element 51") has a color filter, which transmits light of a blue (B) color, above its light receiving surface.

An imaging signal corresponding to a signal charge generated in each photoelectric conversion element 51 is read to an outside of the solid-state imaging device 5 by a known circuit, such as a CMOS circuit or a CCD read circuit formed by a CCD and an amplifier (not shown).

In the following explanation, an imaging signal acquired from the R photoelectric conversion element 51 is called an "R signal", an imaging signal acquired from the G photoelectric conversion element 51 is called a "G signal", and an imaging signal acquired from the B photoelectric conversion element 51 is called a "B signal".

The digital camera shown in FIG. 1 also has a function of shooting while changing image processing for an imaging signal without changing a shooting condition, such as exposure. For example, it is possible to set any one or any ones of five image processing modes in total which includes (a) a standard mode in which standard image processing is performed, (b) a sepia mode in which image processing for expressing a subject in sepia is performed, and (c) three film modes in which image processing capable of expressing a subject as if the subject is shot with particular silver halide films is performed. The number of the image processing modes is not limited to five, but may be any number equal to or larger than two.

Figure 3:
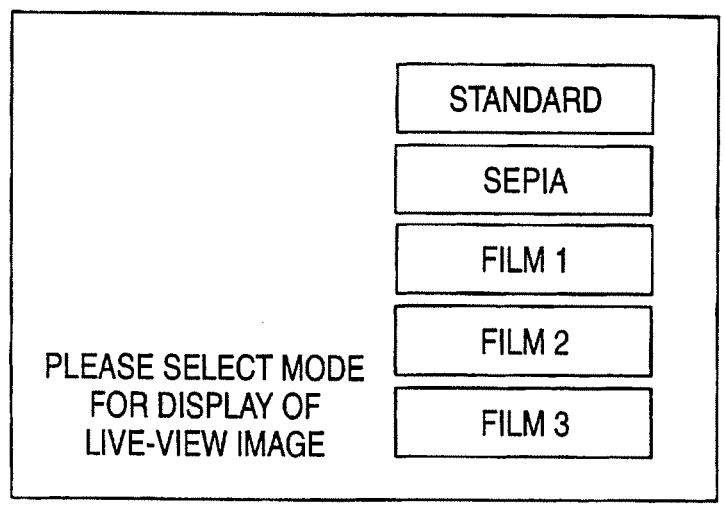
FIG. 3 is a view showing an example of a multi-screen mode setting screen.

Also, the digital camera shown in FIG. 1 has a multi-screen mode in which images which are obtained when shooting is performed in plural image processing modes in the live-view image shooting mode can be compared with each other. The multi-screen mode is such a mode that when a user wants to compare the standard mode with the sepia mode, it becomes easy to select an image processing mode suitable for a scene by displaying on the display section 23 a multi-screen including a live-view image obtained when shooting is performed in the standard mode and a live-view image obtained when shooting is performed in the sepia mode. The digital camera shown in FIG. 1 is, for example, configured so as to be able to select and compare two of the five image processing modes. The multi-screen mode may be set by operating a dedicated button provided in the operation section 14 of the digital camera or operating an icon displayed on the display section 23 in the live-view image shooting mode. FIG. 3 is a view showing an example of a display screen when the multi-screen mode is set. In FIG. 3, icons corresponding to the five image processing modes, which can be set in the digital camera, that is, the standard mode, the sepia mode, the "film 1" mode, the "film 2" mode, and the "film 3" mode are displayed. A user selects icons corresponding to two image processing modes, which the user wants to compare, by operating the operation section 14 in a state where the screen is displayed. The system control section 11 notifies the selected image processing modes to the digital signal processing section 17.

The live-view image processing section 26 included in the digital signal processing section 17 performs different image processings for imaging signals of two groups so as to generate two pieces of image data. The imaging signals of the two groups are obtained when the imaging signals, which are output from the solid-state imaging device 5 in one shooting in the multi screen mode, are divided into the two groups.

Figure 4:
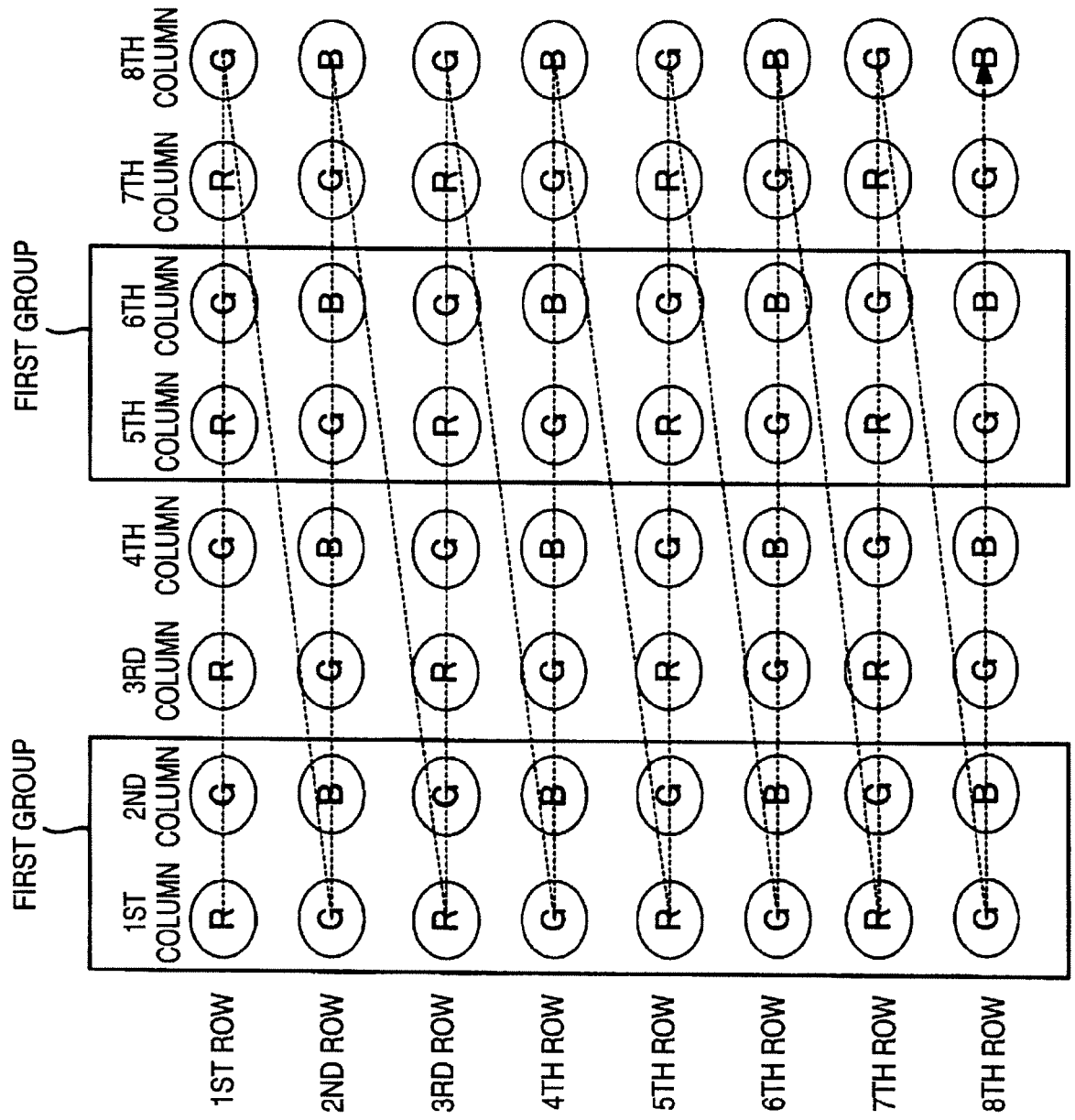
FIG. 4 is a view showing imaging signals which are output from the solid-state imaging device in a live-view image shooting mode.

A division pattern in which the imaging signals are divided into the two groups is set in advance so that imaging signals of different groups are input to the live-view image processing section 26 every two imaging signals. For example, as shown in FIG. 4, it is assumed that imaging signals ("R" denotes an R signal, "G" denotes a G signal, and "B" denotes a B signal in the figure) of 8 rows×8 columns are output from the solid-state imaging device 5 in an order indicated by an arrow which heads toward the lower right side from the upper left side in the figure. In this example, the imaging signals of the first, second, fifth, and sixth columns are referred to as a "first group", and the imaging signals of the other third, fourth, seventh, and eighth columns are referred to as a "second group". In this manner, the imaging signals of the different groups are input to the live-view image processing section 26 every two columns. In the following explanation, it is assumed that that imaging signals are output from the solid-state imaging device 5 as in the example shown in FIG. 4.

Figure 5:
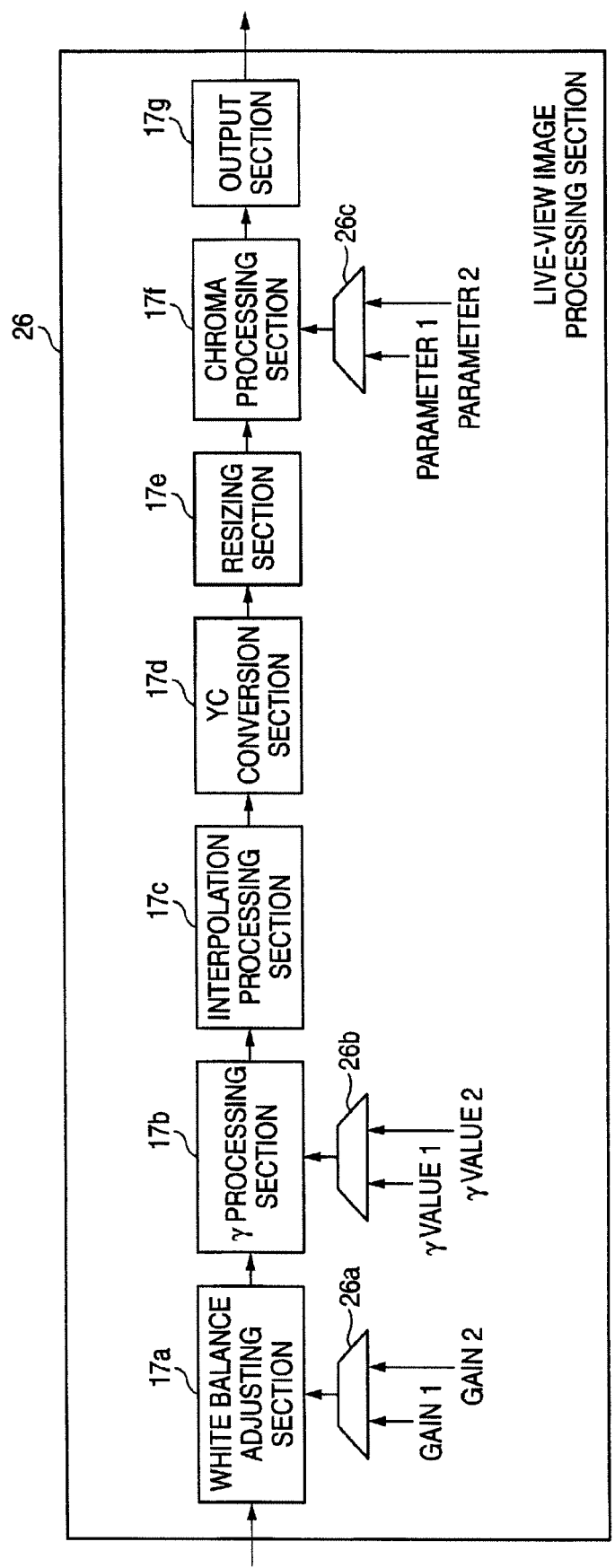
FIG. 5 is a block diagram showing the detailed configuration of a live-view image processing section shown in FIG. 1.

FIG. 5 is a block diagram showing the detailed configuration of the live-view image processing section 26.

An imaging signal input to the live-view image processing section 26 is first input to a white balance adjusting section 17*a*. The white balance adjusting section 17*a* performs white balance adjustment processing by multiplying the input imaging signal by a predetermined white balance gain, and performs processing of outputting the processed imaging signal.

An R signal gain, a G signal gain, and a B signal gain are included in the white balance gain. Also, five patterns corresponding to the five image processing modes described above are prepared for the white balance gain. The white balance gains of the five patterns are stored in a memory of the live-view image processing section 26, for example.

A selector 26*a* is connected to the white balance adjusting section 17*a*, and switching between the white balance gains of two patterns is performed by the selector 26*a*. The white balance gains of two patterns used in two image processing modes (in this example, the two image processing modes are assumed to be the standard mode and the "film 1" mode), which are notified from the system control section 11 and are selected during setting of the multi-screen mode, are input to the selector 26*a*.

Figure 6:
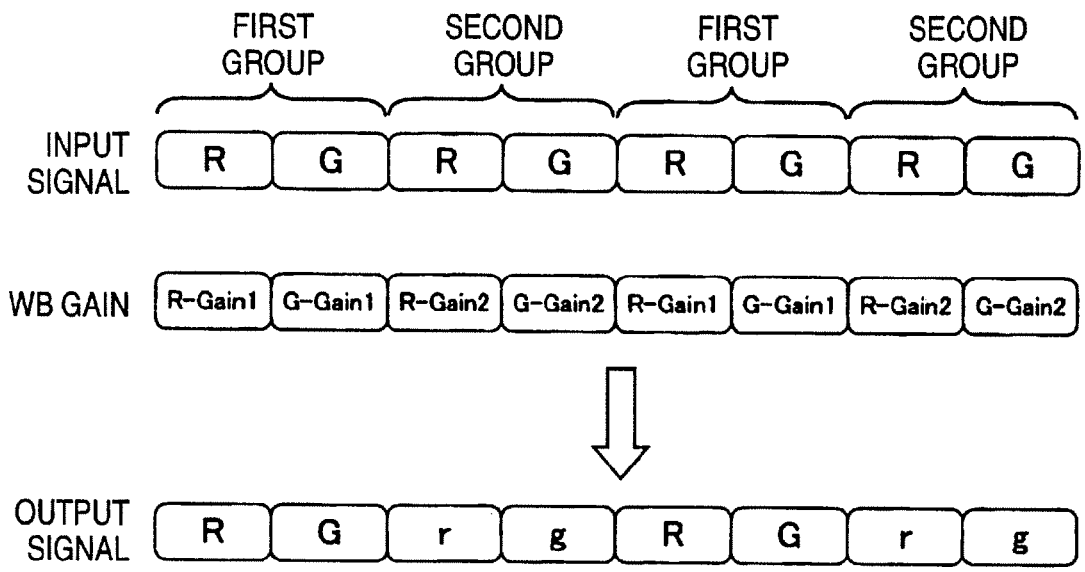
FIG. 6 is a view for explaining white balance adjustment processing performed by a WB adjusting section shown in FIG. 5.

FIG. 6 is a view for explaining the white balance adjustment processing performed by the white balance adjusting section 17*a*.

In FIG. 6, each block of an input signal indicates an imaging signal input to the white balance adjusting section 17*a*. Also, R, G, and B put on the input signals indicate an R signal, a G signal, and a B signal, respectively. A block shown below each input signal is a white balance gain by which the input signal is multiplied. A block shown below the white balance gain is an imaging signal after the white balance adjustment.

As shown in FIG. 6, the white balance adjusting section 17*a* performs the white balance adjustment processing for the imaging signals of the first group using the white balance gains R-Gain1 and G-Gain1 of a pattern which is used in the standard mode, and performs the white balance adjustment processing for the imaging signals of the second group using the white balance gains R-Gain2 and G-Gain2 of a pattern which is used in the "film 1" mode. Moreover, in FIG. 6, notation for the processed imaging signals of the second group is written in lower-case letters.

In this digital camera, the division pattern is set so that the first and second groups are alternately input every two imaging signals. Accordingly, the white balance adjusting section 17*a* can perform different the white balance processing for the first and second groups by changing one pattern of the white balance gain to another pattern of the white balance gain whenever the white balance adjustment processing for two imaging signals ends since input of the imaging signals is started.

The imaging signal output from the white balance adjusting section 17*a* is input to a γ processing section 17*b*. The γ processing section 17*b* performs γ correction processing for the input imaging signal using a predetermined γ value and outputs the processed imaging signal. A γ value for R signal, a γ value for G signal, and a γ value for B signal are included in the γ value. Also, five patterns corresponding to the five image processing modes described above are prepared for the γ value. The γ values of the five patterns are stored in a memory of the live-view image processing section 26, for example.

A selector 26*b* is connected to the γ processing section 17*b*, and switching between the γ values of two patterns is performed by the selector 26*b*. The γ values of the two patterns used in the two image processing modes (for example, the standard mode and the "film 1" mode), which are notified from the system control section 11 and are selected during setting of the multi-screen mode, are input to the selector 26*b*.

Figure 7:
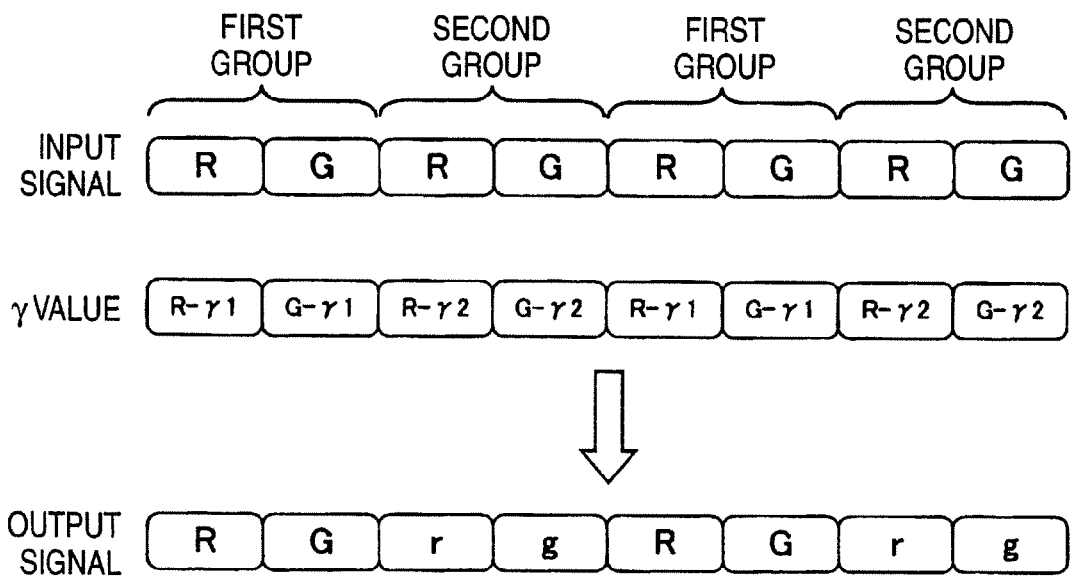
FIG. 7 is a view for explaining γ correction processing performed by a γ processing section shown in FIG. 5.

FIG. 7 is a view for explaining the γ correction processing performed by the γ processing section 17*b*.

In FIG. 7, each block of an input signal indicates an imaging signal input to the γ processing section 17*b*. A block shown below each input signal is a γ value used in the γ correction of the input signal, and a block shown below the γ value is an imaging signal after the γ correction processing.

As shown in FIG. 7, the γ processing section 17*b* performs the γ correction processing for the imaging signals of the first group using the γ values R-γ1 and G-γ1 of a pattern used in the standard mode, and performs the γ correction processing on the imaging signals of the second group using the γ values R-γ2 and G-γ2 of a pattern used in the "film 1" mode.

In this digital camera, the division pattern is set so that the first and second groups are alternately input every two imaging signals. Accordingly, the γ processing section 17*b* can perform different γ correction processings for the first and second groups by changing one pattern of the γ value to another pattern of the γ value whenever the γ correction processing for two imaging signals ends since the input of imaging signals is started.

The imaging signal output from the γ processing section 17*b* is input to an interpolation processing section 17*c*. The interpolation processing section 17*c* performs interpolation processing for interpolating imaging signals of color components other than a color component of an input imaging signal at a sampling point of the input imaging signal, using peripheral imaging signals of the input imaging signal.

Figure 8:
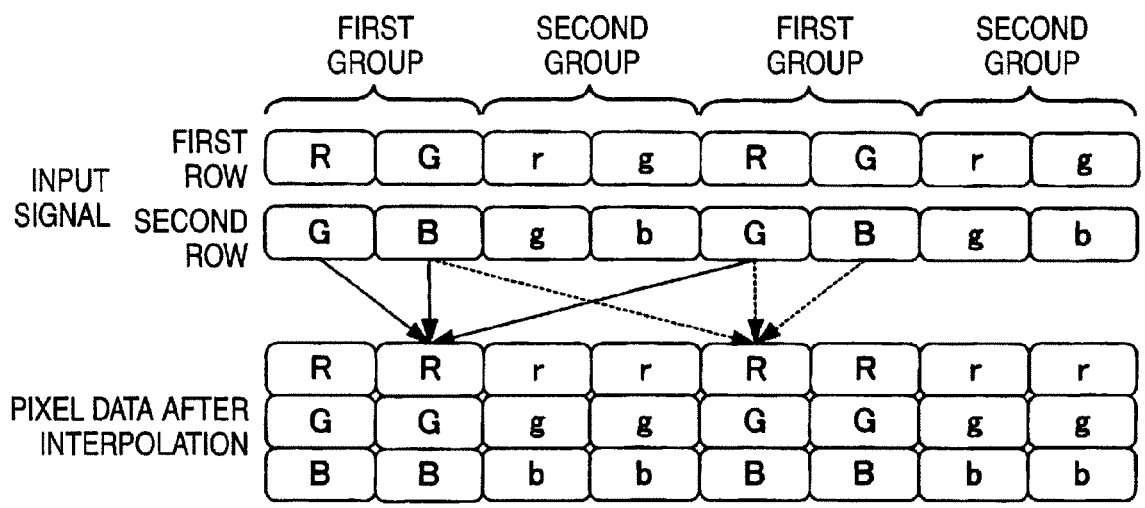
FIG. 8 is a view for explaining interpolation processing performed by an interpolation processing section shown in FIG. 5.

FIG. 8 is a view for explaining the interpolation processing performed by the interpolation processing section 17*c*.

The interpolation processing section 17*c* performs the interpolation processing using imaging signals of a plurality of lines. As shown in FIG. 8, at a sampling point of an imaging signal in interest of the first group, the interpolation processing section 17*c* interpolates the imaging signal using imaging signals of the first group around the imaging signal in interest. Similarly, at a sampling point of an imaging signal in interest of the second group, the interpolation processing section 17*c* interpolates the imaging signal using imaging signals of the second group around the imaging signal in interest.

Data after the interpolation is shown below each input signal shown in FIG. 8. G and B signals of the input signals are interpolated at a sampling point of an R signal, and R and B signals are interpolated at a sampling point of a G signal. Thus, RGB pixel data formed of the R, G, and B signals is generated at the sampling point of each imaging signal of the first group. Similarly, g and b signals of the input signals are interpolated at a sampling point of an r signal, and r and b signals are interpolated at a sampling point of a g signal. Thus, rgb pixel data formed of the r, g, and b signals is generated at the sampling point of each imaging signal of the second group.

The generated pixel data are input to a YC conversion section 17d in the same order as the input sequence of imaging signals corresponding to the pixel data. The YC conversion section 17d converts the signals included in the input pixel data into a YC signal, which includes a luminance signal Y and color difference signals C.

The YC signal output from the YC conversion section 17d is input to a resizing section 17e. The resizing section 17e includes a horizontal resizing section and a vertical resizing section. The YC signal output from the YC conversion section 17d is first resized horizontally by the horizontal resizing section.

Figure 9:
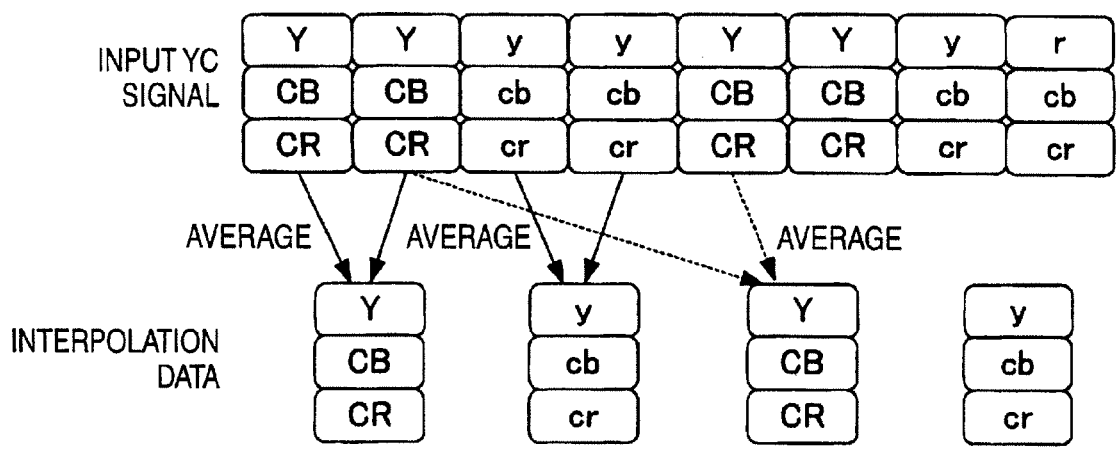
FIG. 9 is a view for explaining horizontal resizing processing performed by a resizing section shown in FIG. 5.

FIG. 9 is a view for explaining the horizontal resizing processing. In FIG. 9, the YC signal converted from the RGB pixel data is expressed by three blocks of Y, CB, and CR, and the YC signal converted from the rgb pixel data is expressed by three blocks of y, cb, and cr. As shown in FIG. 9, two YC signals converted from the RGB pixel data and two YC signals converted from the rgb pixel data are alternately input to the horizontal resizing section.

The horizontal resizing section performs the horizontal resizing processing by calculating an average of an input YC signal and a next input YC signal of the same group and generating a YC signal at a middle position between the sampling points of the two YC signals, which are arranged in the horizontal direction, by interpolation. The averaging operation is sequentially performed when two YC signals of the same group are obtained. Accordingly, as shown in FIG. 9, the averaging operation is alternately performed in the first and second groups, and the YC signals of the first group and the YC signals of the second group are alternately output after the horizontal resizing processing.

Figure 10A:
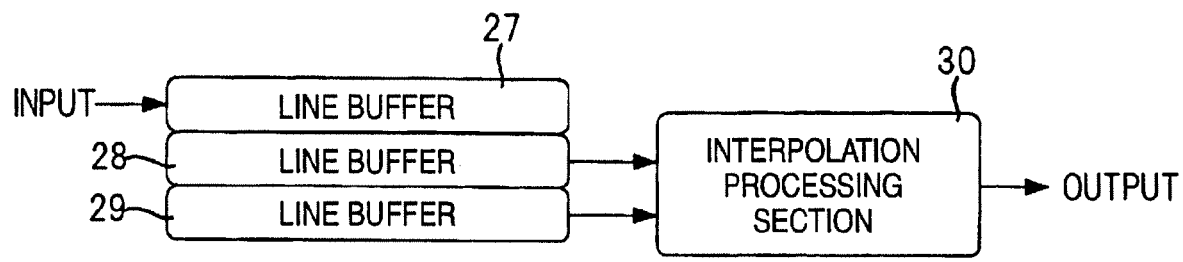
FIGS. 10A and 10B are views for explaining vertical resizing processing performed by the resizing section shown in FIG. 5.

After the horizontal resizing processing is completed, vertical resizing processing is performed by the vertical resizing section. The vertical resizing section includes line buffers 27, 28, and 29 and an interpolation processing section 30, as shown in FIG. 10A.

The vertical resizing section uses the line buffers 27, 28, and 29 as ring buffers. The line buffer 27 is used for writing, and the other line buffers 28 and 29 are used to perform the vertical resizing processing.

Figure 10B:
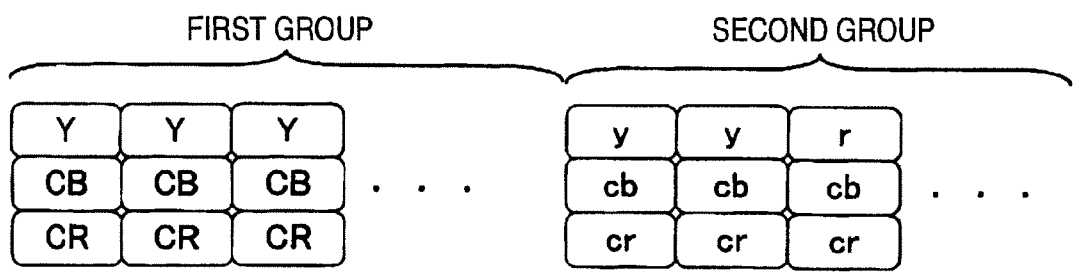

First, the vertical resizing section separates YC signals of the first group and YC signals of the second group from the input data in which the YC signals of the first and second groups are mixed (see FIG. 10B). At this point in time, the first image data formed of the YC signals of the first group and the second image data formed of the YC signals of the second group are generated.

The vertical resizing section sequentially performs the vertical resizing processing for the first and second image data. Specifically, the vertical resizing section performs the vertical resizing processing by writing YC signals of two adjacent lines in the line buffers 28 and 29, calculating an average of the two YC signals adjacent to each other in the vertical direction using the interpolation processing section 30, and generating a YC signal at a middle position between the sampling points of the two YC signals, which are arranged in the vertical direction, by interpolation.

The first and second image data after the vertical resizing are sequentially input to a chroma processing section 17f. The chroma processing section 17f performs chroma adjustment processing for the input image data using a predetermined chroma adjustment parameter. Five patterns corresponding to the five image processing modes described above are prepared for the chroma adjustment parameter. The chroma adjustment parameters of the five patterns are stored in a memory of the live-view image processing section 26, for example.

A selector 26c is connected to the chroma processing section 17f, and switching between the chroma adjustment parameters of two patterns is performed by the selector 26c. The chroma adjustment parameters of the two patterns used in the two image processing modes (for example, the standard mode and the "film 1" mode), which are notified from the system control section 11 and are selected during the setting of the multi-screen mode, are input to the selector 26c.

The chroma processing section 17f performs the chroma adjustment processing for the first image data using a chroma adjustment parameter of a pattern used in the standard mode, and performs the chroma adjustment processing on the second image data using a chroma adjustment parameter of a pattern used in the "film 1" mode.

The first and second image data subjected to the chroma adjustment processing are output from an output section 17g to the display control section 22. Here, a screen, which includes a live-view image based on the first image data and a live-view image based on the second image data, is displayed on the display section 23.

Also, when the multi-screen mode is not set in the live-view image shooting mode, the live-view image processing section 26 inputs a parameter, which corresponds to an image processing mode set by a user or set in advance, to the selectors 26a, 26b, and 26c and performs image processing, which corresponds to the image processing mode set by the user or set in advance, for the imaging signals. Then, one piece of image data is generated and is then output to the display control section 22. As a result, a screen including only one live-view image is displayed on the display section 23.

Figure 11:
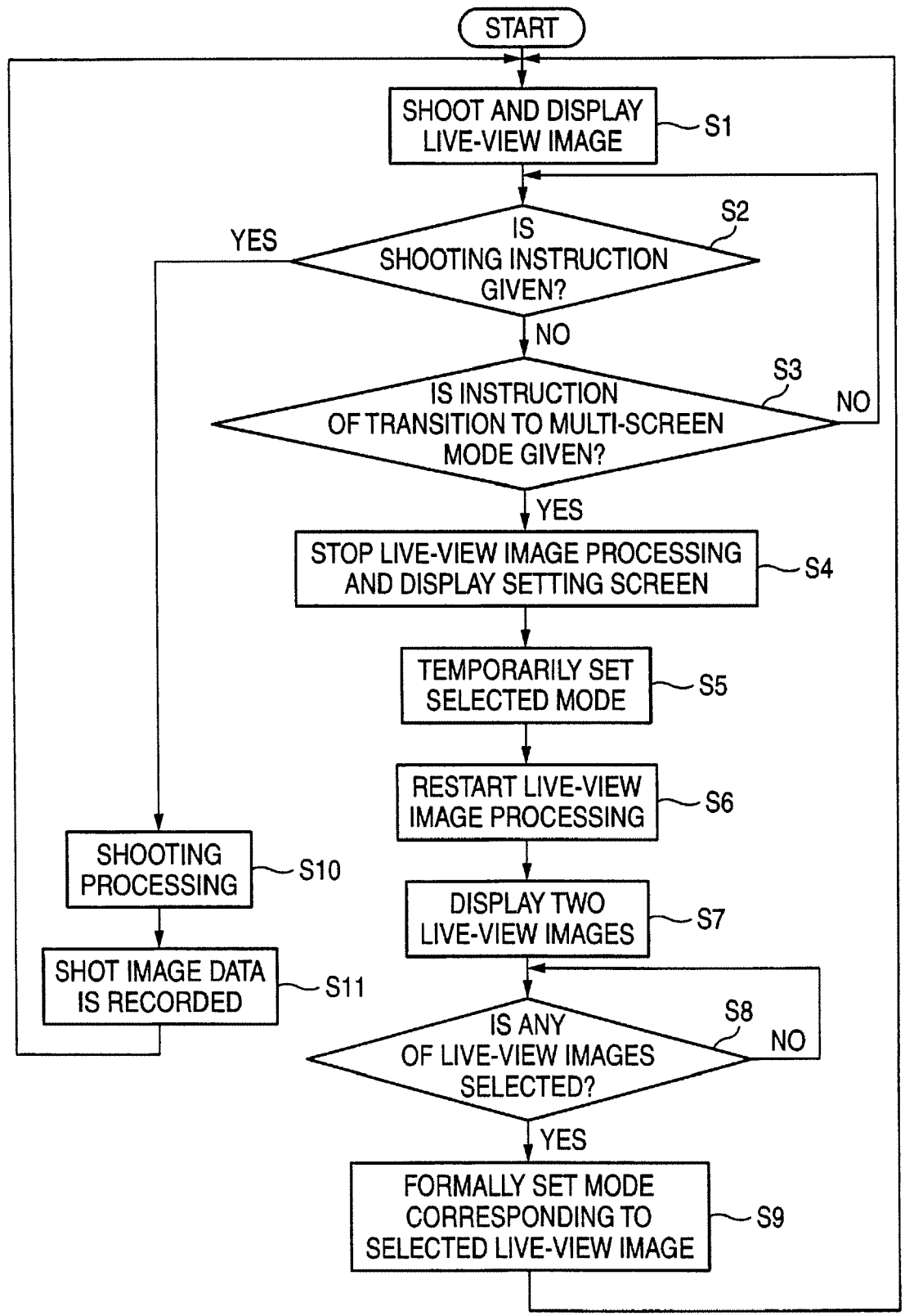
FIG. 11 is a flow chart for explaining an operation of the digital camera shown in FIG. 1.

Next, an operation of the digital camera configured as described above will be described. FIG. 11 is a flow chart for explaining the operation of the digital camera.

When the operation section 14 is operated and the shooting mode is set, the digital camera transitions to the live-view image shooting mode, and a series of live-view image processings of shooting a subject using the solid-state imaging device 5, generating the image data by the live-view image processing section 26, and displaying a live-view image based on the image data are repeatedly performed under control of the system control section 11 (step S1). Also, in an initial setting of the live-view image shooting mode, it is assumed that the standard mode is set in advance as an image processing mode.

When a shooting instruction is given in this state (step S2: YES), shooting processing on the subject is performed by control of the system control section 11 (step S10). Then, image processing based on the standard mode is performed by the digital signal processing section 17 for the imaging signal, which is output from the solid-state imaging device 5 by the shooting processing, and the image data is generated. The generated image data is compressed and is then recorded in the recording medium 21 (step S11). After step S11, the process returns to step S1 to be in a shooting standby state.

When a shooting instruction is not given in the shooting standby state (step S2: NO) and when an instruction of transition to the multi-screen mode is given (step S3: YES), the live-view image processing is stopped by the system control section 11, and the multi-screen mode setting screen shown in FIG. 3 is displayed on the display section 23 (step S4).

Then, when two icons are selected by a user, image processing modes corresponding to the selected icons are temporarily set by the system control section 11 (step S5). Then, the live-view image processing is restarted under control of the system control section 11 (step S6), and a multi-screen shown in FIG. 12 is displayed on the display section 23 (step S7).

Figure 12:
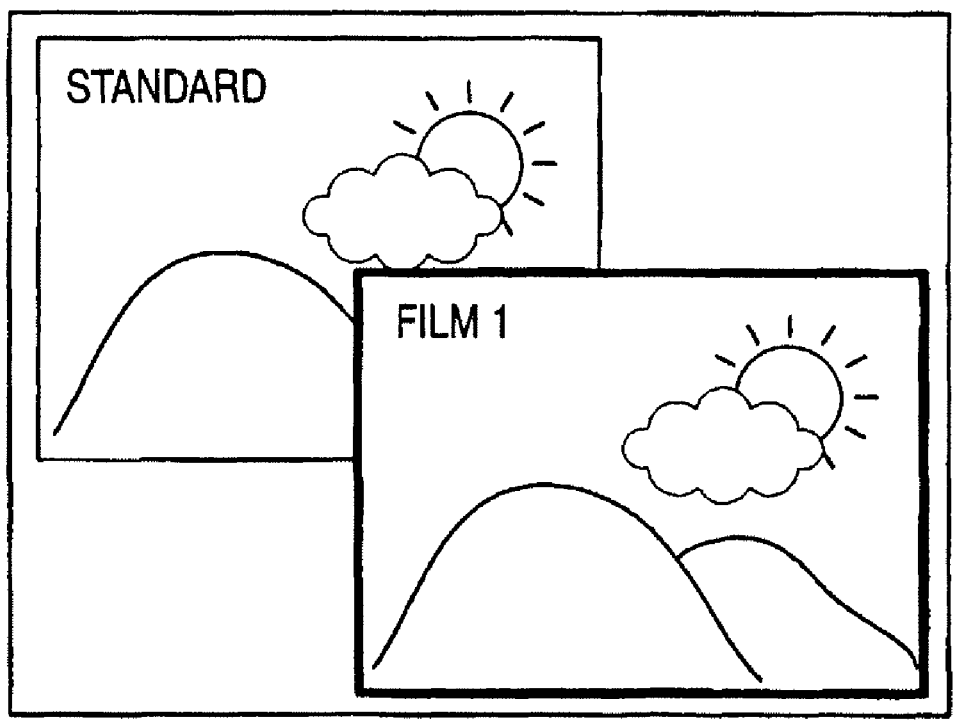
FIG. 12 is a view showing an example of multi-screen display in which plural live-view images are displayed.
Figure 13:
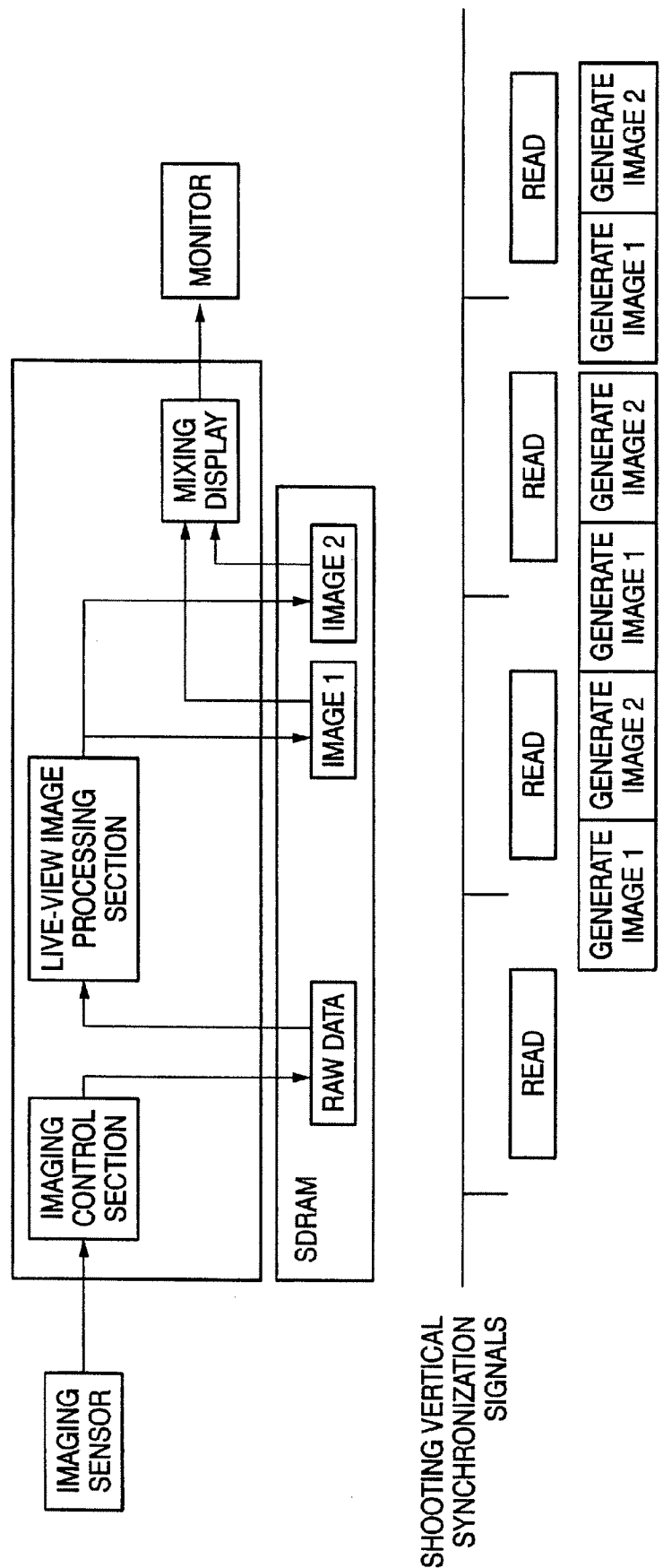
FIG. 13 is a view showing an example of the configuration of an imaging apparatus and an example of a timing chart for image generation according to related art.
Figure 14:
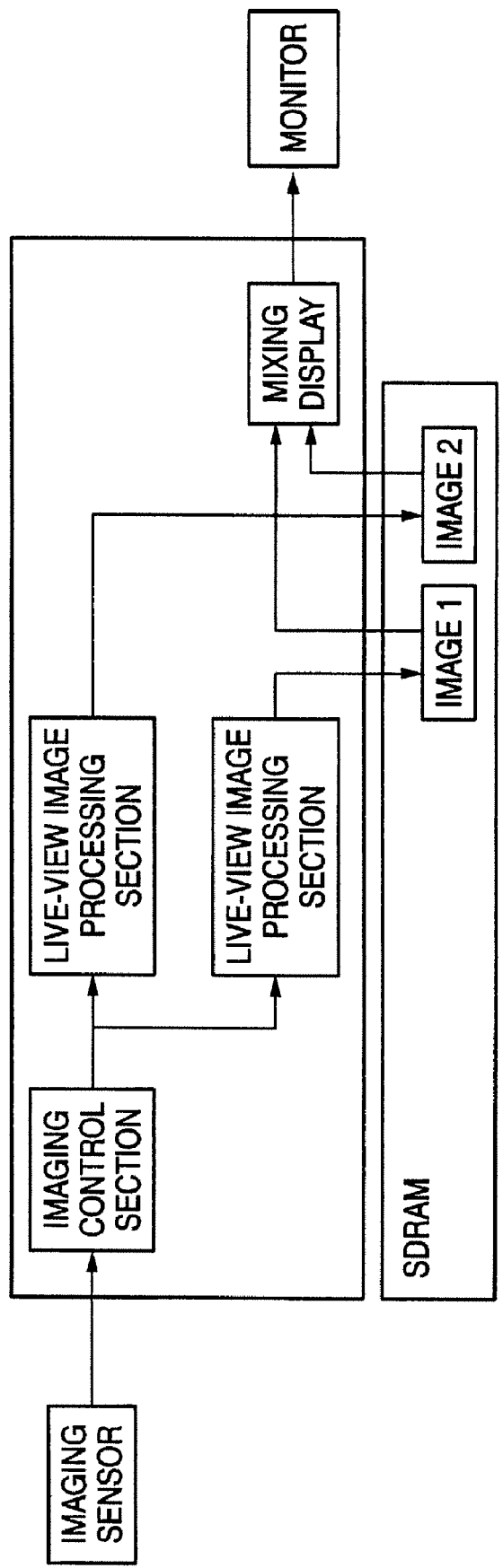
FIG. 14 is a view showing an example of the configuration of an imaging apparatus according to related art.
Figure 15:
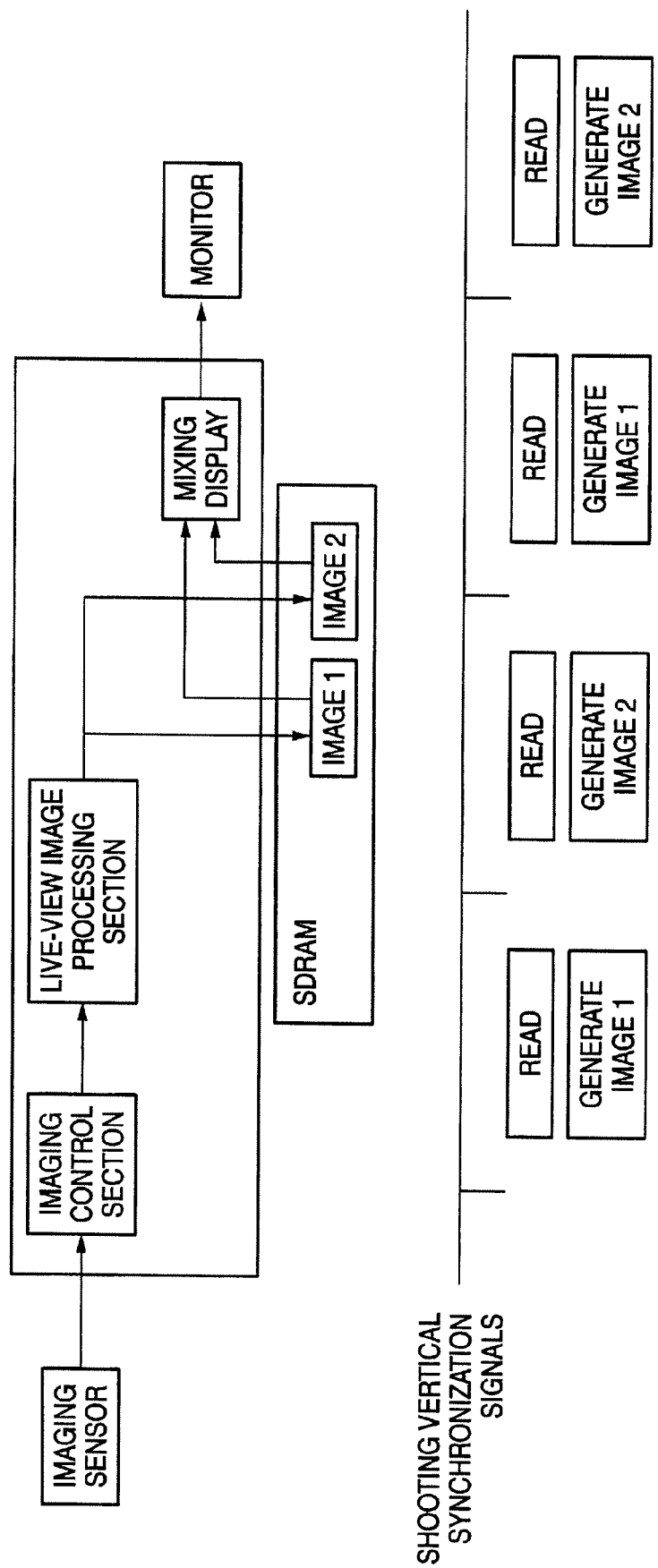
FIG. 15 is a view showing an example of the configuration of an imaging apparatus and an example of a timing chart for image generation according to related art.

As shown in FIG. 12, multi-screen of the live-view image based on the standard mode and the live-view image based on the film "1" mode are displayed on the display section 23. In the example shown in FIG. 12, two live-view images are displayed so as to partially overlap each other. Since the multi-screen is a check screen, it does not cause a problem even if the live-view images partially overlap each other. Rather, since the display size of each live-view image can be enlarged by configuring as described above, it becomes easy to check the images. As a result, the user friendliness can be improved. It is a matter of course that two live-view images may be arranged and displayed so as not to overlap each other.

On the multi-screen shown in FIG. 12, one of the displayed live-view images can be selected by a key operation or touch operation using the operation section 14. In FIG. 12, a state where the "film 1" mode is selected is shown, and the selected live-view image is highlighted and also comes to the foreground.

When one live-view image is selected and when this selection is determined by the user's operation (step S8: YES), an image processing mode corresponding to the selected live-view image is formally set by the system control section 11 (step S9), and the live-view image processing is restarted (step S1). After the live-view image processing is restarted, the live-view image processing section 26 performs the image processing according to the formally set image processing mode and displays on the display section 23 only the live-view image corresponding to the formally set image processing mode.

Then, when a shooting instruction is given in this state (step S2: YES), the process proceeds to step S10 in which image processing based on the formally set image processing mode is performed by the digital signal processing section 17, and the image data is generated. The generated image data is compressed and is then recorded in the recording medium 21 (step S11). After step S11, the process returns to step S1 to be in the shooting standby state again.

As described above, the digital camera handles imaging signals which are obtained in single shooting as two groups, and performs the different imaging processings for the imaging signals of the respective groups to generate two pieces of image data. Accordingly, an amount of image processing can be reduced as compared with the apparatuses described in JP 2008-211843 A and JP 2007-274581 A which generate two pieces of image data by performing image processing twice for all imaging signals obtained in single shooting.

For example, assuming that the number of imaging signals obtained in single shooting is one million, image processing for the 500,000 imaging signals is performed twice in the digital camera shown in FIG. 1, while image processing for the one million imaging signals is performed twice in the apparatuses described in JP 2008-211843 A and JP 2007-274581 A. Accordingly, since the amount of image processing can be reduced to half by simple calculation, it becomes possible to display two live-view images with the same amount of processing as in a general apparatus which displays one live-view image. As a result, a convenient function called a multi-screen mode can be added while suppressing increase in power consumption.

Also, two live-view images which are displayed are shot at the same time. Accordingly, even if there is a moving subject, change does not occur in the two live-view images. As a result, the live-view images can be compared accurately. Also, the two live-view images are generated by one shooting. Accordingly, since reduction in frame rate can be prevented, the live-view images can be smoothly displayed.

Moreover, the processings performed by the interpolation processing section 17c, the YC conversion section 17d, and the resizing section 17e of the digital camera are completed only by changing the processing contents with software in the multi-screen mode and a non-multi-screen mode. That is, in a digital camera having a general configuration which can display one live-view image, the multi-screen mode can be realized only by adding a memory which stores a signal processing parameter for every image processing mode, the selectors 26a and 26b which select a signal processing parameter in units of two imaging signals, and the selector 26c which selects a signal processing parameter in units of image data. Therefore, since increase in the amount of circuits can be suppressed, low cost and miniaturization can be achieved.

Also, according to the digital camera described above, since image processing for an imaging signal can be performed by pipeline processing. Accordingly, since it is not necessary to provide a region for storing all imaging signals output from the solid-state imaging device 5, cost and an apparatus area can be reduced. Also, the image processing can be performed while reading an imaging signal from the solid-state imaging device 5. Accordingly, since a time until a multi-screen is displayed after shooting is performed can be shortened, it is possible to prevent unintentional shooting from being performed.

Also, although the configuration has been described above in which an imaging signal output from the solid-state imaging device 5 is directly input to the live-view image processing section 26 without being recorded in a memory, the invention is not limited thereto. For example, all imaging signals output from the solid-state imaging device 5 in one shooting in the live-view image shooting mode may be once recorded in a memory, such as the main memory 16, and the recorded imaging signals may be divided into two groups. Then, first image data may be generated by reading one group and performing image processing, and then second image data may be generated by reading the other group and performing the image processing. Thus, it is also possible to adopt such a configuration that the live-view image processing section 26 performs the image processings separately for the respective groups in order to generate two pieces of image data. Also, in this configuration, since the amount of image processing can be reduced to half in the apparatuses described in JP 2008-211843 A and JP 2007-274581 A by simple calculation, the power consumption can be sufficiently reduced. Also, since the processings performed by the interpolation processing section 17c, the YC conversion section 17d, and the resizing section 17e of the live-view image processing section 26 do not need to be changed for every group, the processing program can be simplified.

Moreover, although the number (referred to as "n") of live-view images displayed on the multi-screen is fixed to two in the above embodiment, n may be any value so long as it is equal to 2 or more (here, the upper limit of n is the total number of image processing modes which can be set in a camera), and the n may be changed by a user. In this case, the upper limit of the number of image processing modes which can be selected on the setting screen shown in FIG. 3 is set to five, and the number of selected modes is set to n. Then, the live-view image processing section 26 performs the different image processings for image signals of respective groups to generate n pieces of image data. The imaging signals of the respective groups are obtained when imaging signals, which are output from the solid-state imaging device 5 in single shooting in the multi-screen mode, are divided into n groups.

Preferably, all parameters of the five patterns are input to the selectors 26a, 26b, and 26c, and only the parameters of n patterns corresponding to the selected image processing modes are output with switching.

In this case, it is preferable that the division pattern is set in advance as a pattern in which imaging signals of different groups are input to the live-view image processing section 26 every two imaging signals, similar to the case of n=2. For example, in the case of n=3, the division pattern is set so that different groups are set every two columns, that is, imaging signals of the first column, second column, seventh column, eighth column, . . . in FIG. 4 are set as a first group, imaging signals of the third column, fourth column, ninth column, tenth column, . . . are set as a second group, and imaging signals of the fifth column, sixth column, eleventh column, twelfth column, . . . are set as a third group. In this way, imaging signals of different groups are input to the live-view image processing section 26 every two columns.

Moreover, although the chroma adjustment is performed after dividing into the first and second image data in the above description, the chroma adjustment may be performed in a state where imaging signals of the first group and imaging signals of the second group are mixed, similarly to the white balance adjustment processing and the γ correction processing. For example, different chroma adjustments may be performed in the first and second groups by providing the chroma processing section 17f between the γ processing section 17b and the interpolation processing section 17c and changing the chroma adjustment parameter whenever processing for two imaging signals ends.

Alternatively, as another example of the division pattern, imaging signals of first, second, fifth, and sixth rows in FIG. 4 are set as a first group, and imaging signals of the other third, fourth, seventh, and eighth rows are set as a second group. In this way, imaging signals of different groups, which are different every 16 signals, are input to the live-view image processing section 26. In this division pattern, different signal processing can be performed in the first and second groups by changing the parameter whenever processing on the 16 imaging signals ends in the white balance adjusting section 17a and the γ processing section 17b.

Moreover, although the color imaging device in which the color filter is provided above each photoelectric conversion element of the solid-state imaging device 5 has been illustrated in the above embodiment, it is also possible to use a monochrome imaging device in which no color filter is provided. In this case, it is preferable that the division pattern is set in advance so that imaging signals of different groups are input to the live-view image processing section 26 every M (M is a natural number of 1 or more) imaging signals. For example, in the case of n=2, the division pattern is set so that different groups are set every other row, that is, imaging signals of odd rows in FIG. 4 are set as a first group, and imaging signals of even rows are set as a second group. In this way, imaging signals of different groups are input to the live-view image processing section 26 every other row.

Also, the above-described configuration may also be applied to a video camera, a mobile phone with a camera, and the like. Also, the filter arrangement and/or photoelectric conversion element arrangement of the solid-state imaging device 5 is not limited to those shown in FIG. 2, and various other arrangements may be adopted.

As described above, the following matters are disclosed in this specification.

An imaging apparatus has a live-view image shooting mode in which a process of shooting a subject, generating image data from imaging signals acquired by the shooting, and displaying a live-view image based on the image data on a display section is repeatedly performed. The imaging apparatus includes a solid-state imaging device, an image data generating unit, and a display controller. The solid-state imaging device shoots the subject. The image data generating unit performs different image processings for imaging signals of respective groups to generate n pieces of image data. The imaging signals of the respective groups are obtained when imaging signals, which are output from the solid-state imaging device in single shooting in the live-view image shooting mode, are divided into the n groups. n denotes natural number equal to or larger than 2. The display controller displays, on the display section, a screen which includes n live-view images based on the n pieces of image data. The imaging signals are input to the image data generating unit in an order in which the imaging signals are output from the solid-state imaging device. A dividing pattern in which the imaging signals are divided into the n groups is set so that the imaging signals of the different groups are input to the image data generating unit every predetermined number of imaging signals. The image data generating unit includes a signal processing section that performs the signal processes for the input imaging signals using predetermined signal processing parameters. Whenever the signal process for the predetermined number of imaging signals ends, the signal processing section changes the signal processing parameter to a signal processing parameter corresponding to the group of the imaging signals which will be input next, and performs the signal process.

With this configuration, the n pieces of image data are generated by performing different image processing for groups into which imaging signals obtained in one shooting are divided. Accordingly, the amount of image processing can be reduced to approximately a half of that in the apparatuses described in JP 2008-211843 A and JP 2007-274581 A which generate n pieces of image data by performing image processing n times for all imaging signals obtained in single shooting. Also, since the n live-view images are shot at the same time, change does not occur in the n live-view images even if there is a moving subject. Accordingly, the live-view images can be compared accurately. Also, since the n live-view images are generated in single shooting, reduction in frame rate can be suppressed. Accordingly, the live-view images can be smoothly displayed.

Also, with the above configuration, different image processing can be performed for the respective groups only by changing the signal processing parameter for input signals in which imaging signals of the plural groups are mixed. Accordingly, since it is not necessary to provide an area for storing all imaging signals output from the solid-state imaging device, cost and an apparatus area can be reduced. Also, since the image processing can be performed while reading an imaging signal from the solid-state imaging device, a time until a screen is displayed after shooting is performed can be shortened. As a result, it is possible to prevent unintentional shooting from being performed.

In the imaging apparatus disclosed in this specification, the signal processing parameters includes any of a white balance gain, a γ value, and chroma.

In the imaging apparatus disclosed in this specification, a plurality of types of modes are provided which are the same in shooting condition and are different in image processing. The imaging apparatus further includes a setting unit that sets the number of modes, which are selected from among the plurality of types of modes by an external operation, to n. The setting unit sets the image processings, which are to be performed for the respective set n groups, according to the selected modes.

With this configuration, by arbitrarily selecting a mode in which a user wants to check a shooting result, the shooting result in the mode can be checked on the display section.

The imaging apparatus disclosed in this specification further includes a mode setting unit that sets the mode corresponding to a live-view image selected by an external operation from among the n live-view images, which are displayed on the display section.

With this configuration, by selecting a live-view image that a user likes, the mode for obtaining the live-view image can be simply set.

In the imaging apparatus disclosed in this specification, the display controller displays the n live-view images so that the n live-view images partially overlap each other on the screen.

With this configuration, the display size of each live-view image can be enlarged. As a result, it becomes easy to check the live-view image.

This specification also discloses the following live-view image display method of an imaging apparatus. That is, the imaging apparatus has a live-view image shooting mode in which a process of shooting a subject, generating image data from imaging signals acquired by the shooting, and displaying a live-view image based on the image data on a display section is repeatedly performed. The live-view image display method of the imaging apparatus includes generating n pieces of image data by performing different image processings for imaging signals of respective groups, and displaying, on the display section, a screen which includes n live-view images based on the n pieces of image data. The imaging signals of the respective groups are obtained when imaging signals, which are output from a solid-state imaging device in single shooting in the live-view image shooting mode, are divided into the n groups. n denotes natural number equal to or larger than 2. The generating of the n pieces of image data includes performing signal processes, using predetermined signal processing parameters, for the imaging signals which are sequentially input in order of output from the solid-state imaging device. A dividing pattern in which the imaging signals are divided into the n groups is set so that the imaging signals of the different groups are input every predetermined number of imaging signals. During the performing of the signal processes in the generating of the n pieces of image data, whenever the signal process for the predetermined number of imaging signals ends, the signal processing parameter is changed to a signal processing parameter corresponding to the group of the imaging signals which will be input next, and the signal process is performed.

In the live-view image display method disclosed in this specification, the signal processing parameters includes any of a white balance gain, a γ value, and chroma.

The live-view image display method disclosed in this specification further includes setting the number of modes being selected by an external operation from among a plurality of types of modes, which are the same in shooting condition and are different in image processing, to n, and setting the image processings, which are to be performed for the respective set n groups, according to the selected modes.

The live-view image display method disclosed in this specification further includes setting the mode corresponding to a live-view image selected by an external operation from among the n live-view images, which are displayed on the display section.

In the live-view image display method disclosed in this specification, the displaying of the n live-view images displays the n live-view images so that the n live-view images partially overlap each other on the screen.

What is claimed is:

1. An imaging apparatus having a live-view image shooting mode in which a process of shooting a subject, generating image data from imaging signals acquired by the shooting, and displaying a live-view image based on the image data on a display section is repeatedly performed, the imaging apparatus comprising:
   a solid-state imaging device that shoots the subject;
   an image data generating unit that performs different image processings for imaging signals of respective groups to generate n pieces of image data, wherein
      the imaging signals of the respective groups are obtained when imaging signals, which are output from the solid-state imaging device in single shooting in the live-view image shooting mode, are divided into the n groups, and
      n denotes natural number equal to or larger than 2;
   a display controller that displays, on the display section, a screen which includes n live-view images based on the n pieces of image data, wherein
   the imaging signals are input to the image data generating unit in an order in which the imaging signals are output from the solid-state imaging device,
   a dividing pattern in which the imaging signals are divided into the n groups is set so that the imaging signals of the different groups are input to the image data generating unit every predetermined number of imaging signals,
   the image data generating unit includes a signal processing section that performs the signal processes for the input imaging signals using predetermined signal processing parameters, and
   whenever the signal process for the predetermined number of imaging signals ends, the signal processing section changes the signal processing parameter to a signal processing parameter corresponding to the group of the imaging signals which will be input next, and performs the signal process.

2. The imaging apparatus according to claim 1, wherein the signal processing parameters includes any of a white balance gain, a γ value, and chroma.

3. The imaging apparatus according to claim 1, wherein
   a plurality of types of modes are provided which are the same in shooting condition and are different in image processing,
   the imaging apparatus further comprising:
   a setting unit that sets the number of modes, which are selected from among the plurality of types of modes by an external operation, to n, wherein
   the setting unit sets the image processings, which are to be performed for the respective set n groups, according to the selected modes.

4. The imaging apparatus according to claim 3, further comprising:
   a mode setting unit that sets the mode corresponding to a live-view image selected by an external operation from among the n live-view images, which are displayed on the display section.

5. The imaging apparatus according to claim 1, wherein the display controller displays the n live-view images so that the n live-view images partially overlap each other on the screen.

6. A live-view image display method of an imaging apparatus having a live-view image shooting mode in which a process of shooting a subject, generating image data from imaging signals acquired by the shooting, and displaying a live-view image based on the image data on a display section is repeatedly performed, the method comprising:

generating n pieces of image data by performing different image processings for imaging signals of respective groups, wherein the imaging signals of the respective groups are obtained when imaging signals, which are output from a solid-state imaging device in single shooting in the live-view image shooting mode, are divided into the n groups, and n denotes natural number equal to or larger than 2;

displaying, on the display section, a screen which includes n live-view images based on the n pieces of image data, wherein the generating of the n pieces of image data includes performing signal processes, using predetermined signal processing parameters, for the imaging signals which are sequentially input in order of output from the solid-state imaging device, a dividing pattern in which the imaging signals are divided into the n groups is set so that the imaging signals of the different groups are input every predetermined number of imaging signals, during the performing of the signal processes in the generating of the n pieces of image data, whenever the signal process for the predetermined number of imaging signals ends, the signal processing parameter is changed to a signal processing parameter corresponding to the group of the imaging signals which will be input next, and the signal process is performed.

7. The live-view image display method according to claim 6, wherein the signal processing parameters includes any of a white balance gain, a γ value, and chroma.

8. The live-view image display method according to claim 6, further comprising:

setting the number of modes being selected by an external operation from among a plurality of types of modes, which are the same in shooting condition and are different in image processing, to n; and setting the image processings, which are to be performed for the respective set n groups, according to the selected modes.

9. The live-view image display method according to claim 8, further comprising:

setting the mode corresponding to a live-view image selected by an external operation from among the n live-view images, which are displayed on the display section.

10. The live-view image display method according to claim 6, wherein the displaying of the n live-view images displays the n live-view images so that the n live-view images partially overlap each other on the screen.

* * * * *